July 24, 1934. H. M. PFLAGER 1,967,478
RAILWAY BRAKE CONSTRUCTION
Filed Nov. 2, 1932 3 Sheets-Sheet 3
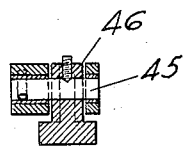
Fig-8-
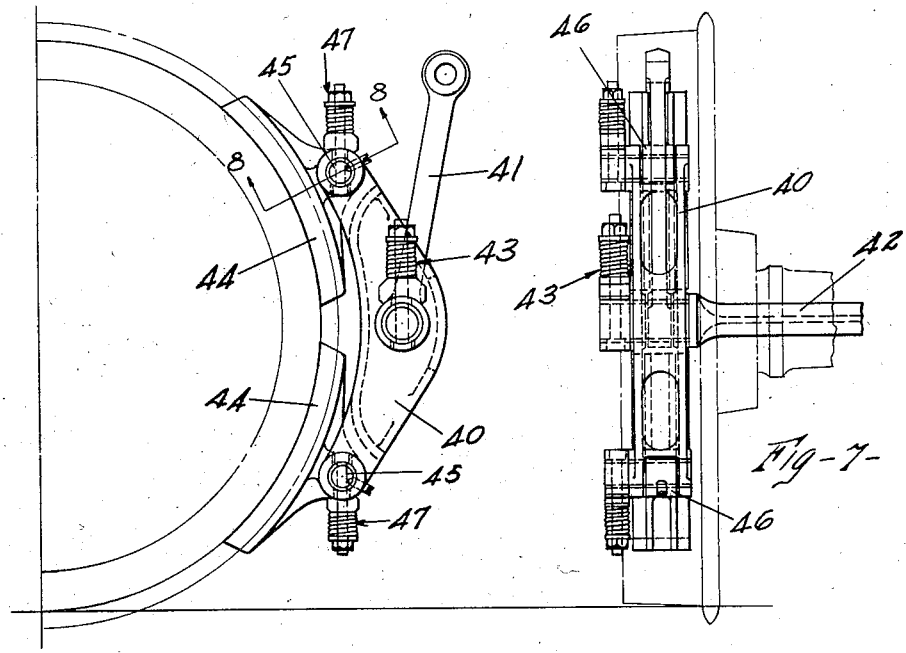
Fig-6-    Fig-7-
Inventor
Harry M. Pflager
By Rodney Bedell
Attorney Patented July 24, 1934

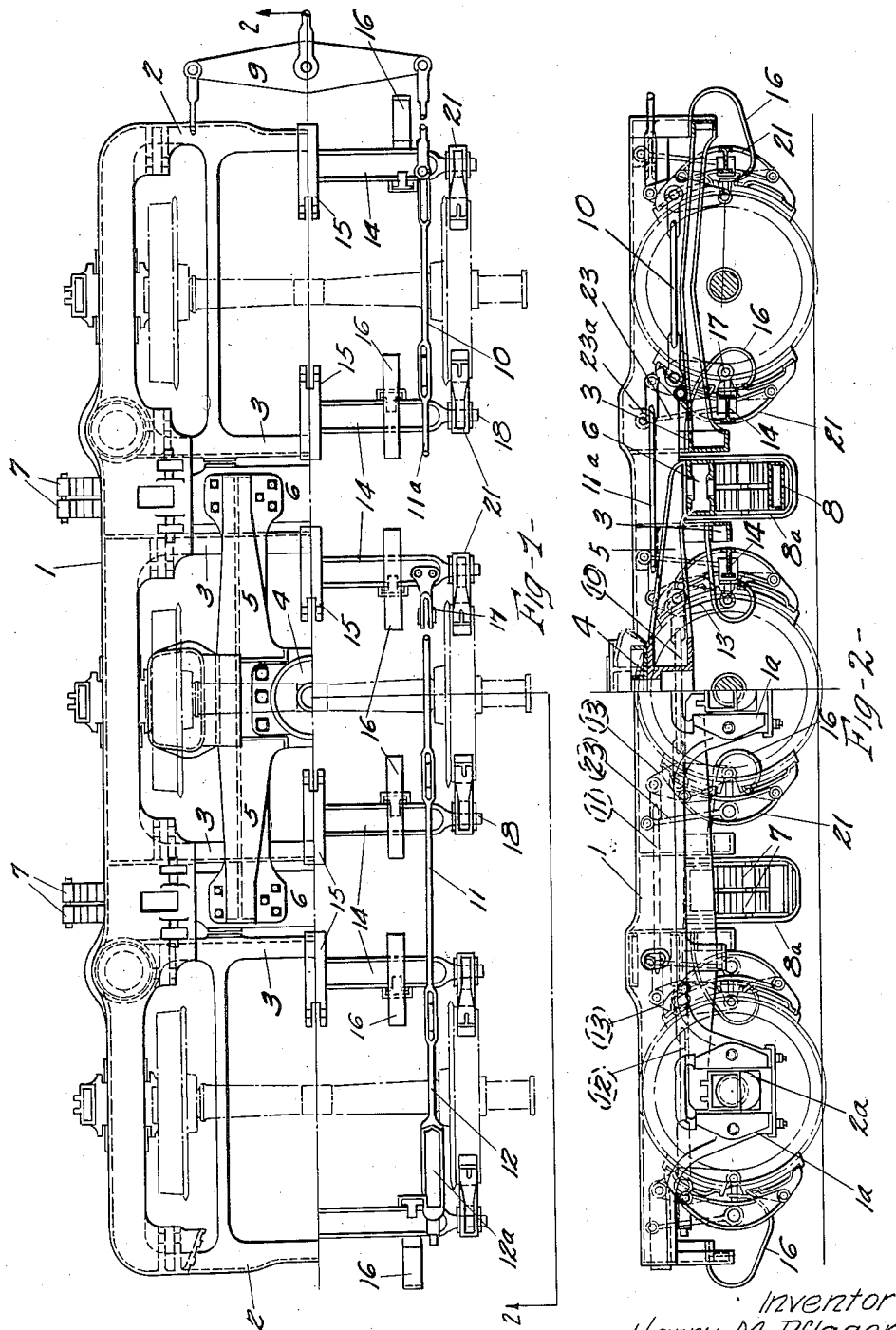

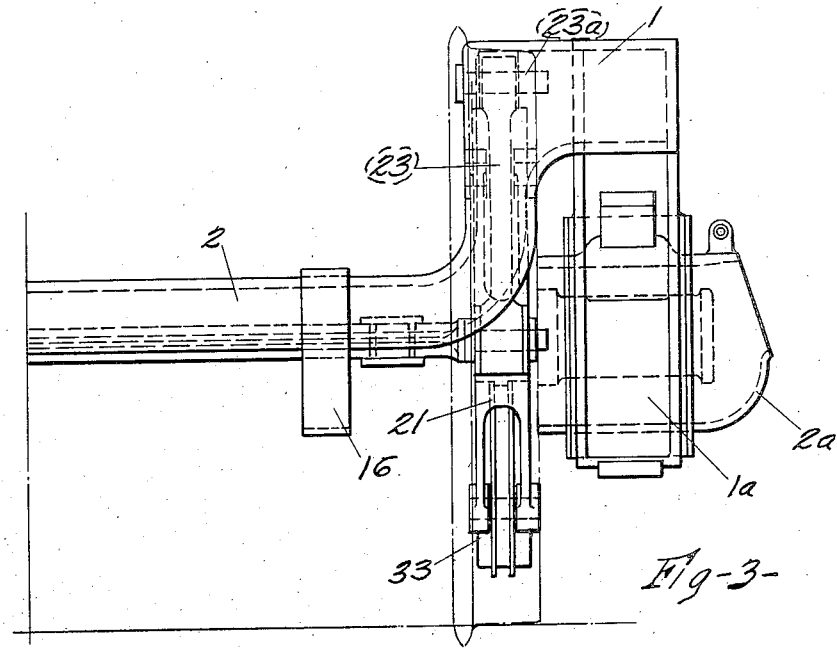
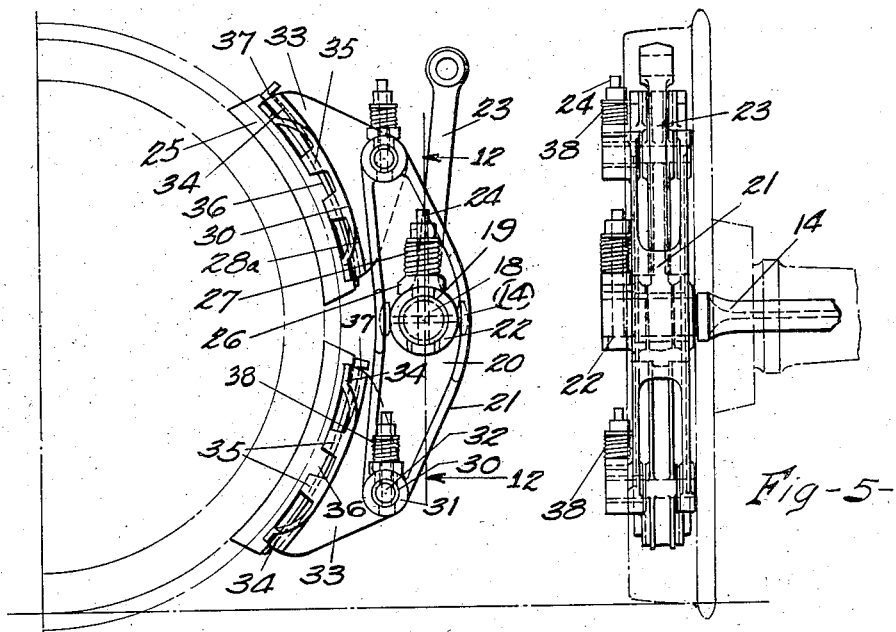

1,967,478

UNITED STATES PATENT OFFICE 1,967,478

RAILWAY BRAKE CONSTRUCTION

Harry M. Pflager, St. Louis, Mo., assignor to General Steel Castings Corporation, Granite City, Ill., a corporation of Delaware Application November 2, 1932, Serial No. 640,763

2 Claims. (Cl. 188—206)

This invention relates to railway rolling stock and embodies improvements in brakes for high speed trains.

The present trend in railroad transportation is towards providing faster schedules requiring speeds of 100 miles per hour or more in order to compete with airplane travel. Such improved service should also enable the railroads to better compete with other transportation agencies as automobiles, trucks and busses.

Heretofore the trucks for railway vehicles have been equipped with a single brake shoe on one or both sides of each wheel. These brake shoes, at ordinary speeds, are subject to severe heating due to the pressure exerted against the tire of the wheel, which generates sufficient heat to cause thermal cracks in the tires of the wheel and cracks in the brake shoe. This occurs at the present speeds, which average about 50 miles per hour, and the present construction is not satisfactory for economically operating at high speeds. As an illustration, the kinetic energy of each pair of 36 inch wheels and axles amounts to 85,400 foot pounds at a speed of 50 miles per hour, (making 467 revolutions per minute). With the same wheels and axles, running at the rate of 100 miles per hour, the kinetic energy would be 342,000 foot pounds (making 934 revolutions per minute).

In addition to overcoming the kinetic energy of the revolving wheel, the brakes have to overcome the inertia of the train, which at 100 miles is four times as great as at 50 miles per hour.

It will therefore be seen that it is necessary in high speed trains to greatly improve the braking condition in order to stop the train within a reasonable distance without causing such excessive heat from the braking apparatus that will damage the tires of the wheels. Such improvement is the object of the present invention and this object is attained substantially by providing a brake arrangement having two or more pairs of equalized brake shoes on either side of the wheel, forming a brake on a large portion of the circumference of the wheel which, due to the area covered, will require minimum pressure per square inch, thereby producing a car retarding effect on the wheel without damaging its structure.

The above object and others are attained by the structures illustrated in the accompanying drawings in which—

Figure 1 is a top view of a truck embodying the invention, the lower half showing the wheels, axles, and brake rigging only.

Figure 2 is in part a side view of the truck, and in part a longitudinal section taken on the line 2—2 of Figure 1.

Figure 3 is a half end view of the structure.

Figures 4 and 5 are detail side and end views showing the double brake head and equalizer arrangement.

Figures 6 and 7 are similar views showing a modified construction.

Figure 8 is a detail section on the line 8—8 of Figure 6.

The general features of the six-wheel truck illustrated in Figures 1, 2 and 3 are of known construction and include a frame with wheel pieces 1, having pedestals 1a receiving journal boxes 2a, end sills 2, and intermediate transoms 3. The bolster has center plate structure 4 and longitudinally disposed arms 5 secured to transverse members 6 extending between the pairs of transoms 3 and supported upon elliptic springs 7 carried by the spring planks 8 and swing hangers 8a pivoted to the transoms 3.

The clasp brake rigging includes a transverse lever 9, overhead rods 10, 11 and 12, the latter having openings 12a for slack adjusters, brake levers 13, and solid type I-section brake beams 14, a pair of beams being provided for each pair of wheels. The forward or inner portions of the beams are supported by hangers (not shown) pivoted to the bifurcated ends of the brackets 15 secured to the intermediate transoms 3 and end sills 2. Resilient brake release straps 16 are secured to convenient points on the frame and to the brake beams adjacent the fulcrum arms 17.

The end of each beam 14 is provided with a cylindrical pin-like portion 18 which extends through bushed bearings in the side walls 20 of the brake equalizer member, indicated generally at 21. Cylindrical portion 18 and the outer bushing 19 extend a short distance beyond the outer wall 20 of the equalizer member and are surrounded by a slotted boss 22 on the equalizer. A brake hanger 23 is supported at the top from a suitable hanger bracket on the truck frame, such as 23a, and is pivotally secured to the portion 18 of the beam between the walls 20.

Rotation of the equalizer relative to the hanger is yieldingly resisted by a friction lock device including a bolt 24 extending through boss 22 and the cylindrical portion 18 of the beam and mounting a block 26 yieldingly held against bushing 19 by a spring 27 which is compressed between the block and a washer 28 and nut 28a at the top of the bolt.

At the upper and lower extremities of the equalizer 21 are alined openings 30 in the walls 20, there being a boss 31 surrounding each opening 30 in the outer wall. These openings receive pins 32 which pivotally mount vertically alined brake heads 33. Rotation of the brake heads relative to the equalizer is yieldingly resisted by frictional locks 38 similar to the lock device (24, 26, 27, and 28) associated with the hanger connection.

Each head has spaced end toes 34 and center lugs 35 and mounts a brake shoe 25 of standard construction including a center lug 36 inserted between the head lugs 35 and having the usual end shoulders seated between the head toes 34. Each shoe is secured to the corresponding head by means of an ordinary curved key 37 extending through lugs 35 and 36 and preferably of slightly less radius of curvature than the shoe in order to maintain the parts tightly assembled.

The novel head assembly is sufficiently flexible to permit the shoes to conform with the wheel tread, as clearly shown in Figure 4, regardless of the state of wear of the shoes and tread, but at the same time has sufficient rigidity to permit the shoes to be withdrawn from the tread as a unit to prevent tapping or dragging due to vibration of the vehicle.

In the modification illustrated in Figures 6, 7, and 8, an elongated body or equalizing member 40 is pivoted, as in the previous form, to the lower end of the hanger 41 and to the outer end of a beam 42 through which the braking force is applied. A friction lock device 43 corresponds to that previously described.

The ends of member 40 are bifurcated and directly and pivotally mount separate shoes 44 which have no direct connection with each other and may be independently renewed. Pins 45 are inserted through bushed holes in the bifurcated ends of member 40 and in lugs 46 on the shoes, relative rotation of the equalizer and shoes being resisted by the friction devices 47. The shoes cooperate to provide an extended braking surface as in the form previously described, and the entire structure eliminates the individual heads for each shoe and makes for a more economical arrangement and also for a shorter wheel base.

Each arrangement permits the use of four brake shoes per wheel instead of two, and obviously substantially increases the braking surface and total effectiveness over that present with the use of the usual arrangement without increasing the friction per square inch of the braking surface, which in turn determines the heat generated. The invention is especially advantageous when applied to passenger train trucks, intended for high speed operation, and the use of the device eliminates jerking which accompanies the application of high braking pressures to single brake shoes.

Variations in the details may be made without departing from the spirit of the invention and I contemplate the exclusive use of all such modifications as come within the scope of the appended claims.

What is claimed is:

1. In a railway truck, a frame, a brake hanger swinging freely therefrom, an equalizer having a freely pivoting connection with said hanger, a pair of vertically spaced brake heads having independent freely pivoting connections with said equalizer, and means yieldingly resisting relative rotation of said hanger and said equalizer and of said equalizer and said heads.

2. In a railway truck, an equalizer suspended intermediate its ends from the truck frame, and a pair of brake elements disposed longitudinally of said equalizer and having pivotal connections to the adjacent end portions thereof, and means yieldingly resisting relative rotation of said equalizer and said elements.

H. M. PFLAGER.